INVENTOR.
Maksymilian Burk

INVENTOR.
Maksymilian Burk

United States Patent Office
3,664,809
Patented May 23, 1972

3,664,809
RECOVERY OF ALUMINA FROM ALUMINOSILICATES
Maksymilian Burk, Los Angeles, Calif., assignor to TRW Inc., Redondo Beach, Calif.
Filed May 4, 1970, Ser. No. 34,063
Int. Cl. C01f 7/04
U.S. Cl. 23—141                    3 Claims

ABSTRACT OF THE DISCLOSURE

Alumina, $H_2S$ and potash are recovered from aluminosilicates such as kaolin clay by reducing and then calcining a mixture of clay and polyhalite to yield a sinter of calcium and/or magnesium silicates and potassium aluminate and $H_2S$ in the gas phase. The potassium aluminate is leached out of the sinter with potassium hydroxide and/or potassium carbonate solution and reacted with $CO_2$ to yield an aluminum hydroxide precipitate and a potassium carbonate solution.

BACKGROUND OF THE INVENTION

This invention relates to the recovery of alumina from hydrated aluminosilicates such as kaolin clay. More specifically, this invention relates to the reaction between potassium sulfate bearing ore such as a polyhalite and a kaolin clay to produce alumina and other coproducts such as hydrogen sulfide and various salts of sodium or potassium.

The use of clay as a source of alumina is well known and typical processes for the recovery of alumina from clays are disclosed in U.S. Pats. 521,712, 1,680,066, 1,681,921, 1,760,788, and 2,160,148. In general, the prior art requires that clay or bauxite be reacted with large quantities of alkalis in order to recover the alumina value from the raw material. The processes involving clay as raw material have never been thoroughly exploited because it is far cheaper to employ a bauxite ore as the raw material than to use an inexpensive clay plus the relative expensive reagents. Interrelated with this problem is the fact that the only useful product from the clay is the alumina. Where sulfur dioxide or $H_2S$ are formed as coproducts in prior art processes, they are employed to react with ammoniacal compounds to generate the ammonium sulfate.

With this background in mind, it is an object of the invention to provide a process which produces alumina, $H_2S$ and various salts of sodium or potassium as coproducts of a reaction between aluminosilicate ores and alkali earth sulfate ores, particularly potash bearing alkali earth sulfate ores.

Another object is to recover the potash from a polyhalite ore.

Another object is to react a polyhalite clay and a kaolin-type clay to recover alumina, $H_2S$ and potassium carbonate as coproducts without the necessity of employing sodium or potassium carbonates, hydroxide or sulfates or other reagents for reacting with the clay.

It has been discovered that if a potassium sulfate bearing ore such as langbeinite or polyhalite ore is reacted with an aluminosilicate ore such as a kaolin clay by reducing and then calcining, the potassium sulfate value in the polyhalite will be reduced and will preferentially react with the alumina component of the kaolin clay to product $H_2S$ and a sinter containing predominantly calcium and magnesium silicates and potassium aluminate. Hydrogen sulfide is extracted from the gases after the reduction stage and may be recovered.

The potassium aluminate is then leached out of the sinter with a KOH and/or $K_2CO_3$ solution to produce a solution of potassium aluminate. Carbon dioxide from the flue gas of the calcination stage is employed to react with the potassium aluminate solution to form an aluminum hydroxide precipitate plus potassium carbonate.

The aluminum hydroxide then may be calcined to yield alumina, and the potassium carbonate is crystallized from the solution and may be converted to potash by drying.

It has been discovered that in the reaction between the polyhalite and the kaolin, the calcium and magnesium sulfate components of the polyhalite after reduction and/or conversion to oxides preferentially react with the unwanted silica of the kaolin, while the potassium sulfate component of the polyhalite after reduction and/or conversion to the oxide preferentially reacts with the alumina component of the kaolin to produce a sinter containing potassium aluminate. The sinter is then leached by known processes to yield a potassium aluminate solution which is then reacted with $CO_2$ to precipitate aluminum hydroxide and form $K_2CO_3$ in solution. Calcination of the aluminum hydroxide yields alumina; the potassium carbonate solution is converted to potash.

Also, it has been found that in the reaction between the polyhalite and the kaolin clay, the potassium sulfate and alumina react in approximately stoichiometric proportions, whereas in prior art processes, such as in U.S. Pat. 1,680,066, a considerable stoichiometric excess of sodium sulfate is required for combining with the alumina.

(1) Beneficiated kaolin

Figure 1:
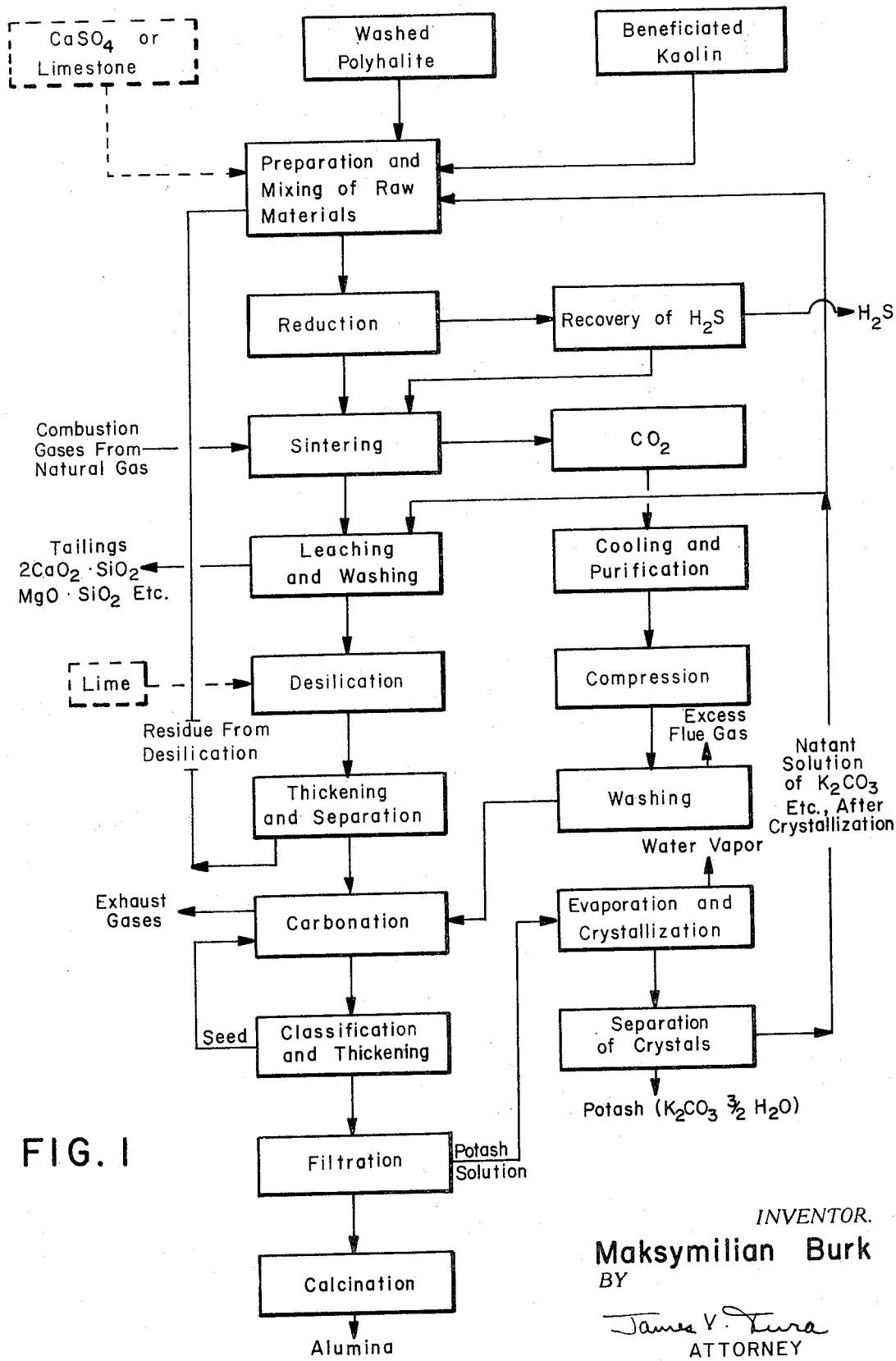
FIG. 1 is a flow diagram illustrating the overall steps of the process.
Figure 2:
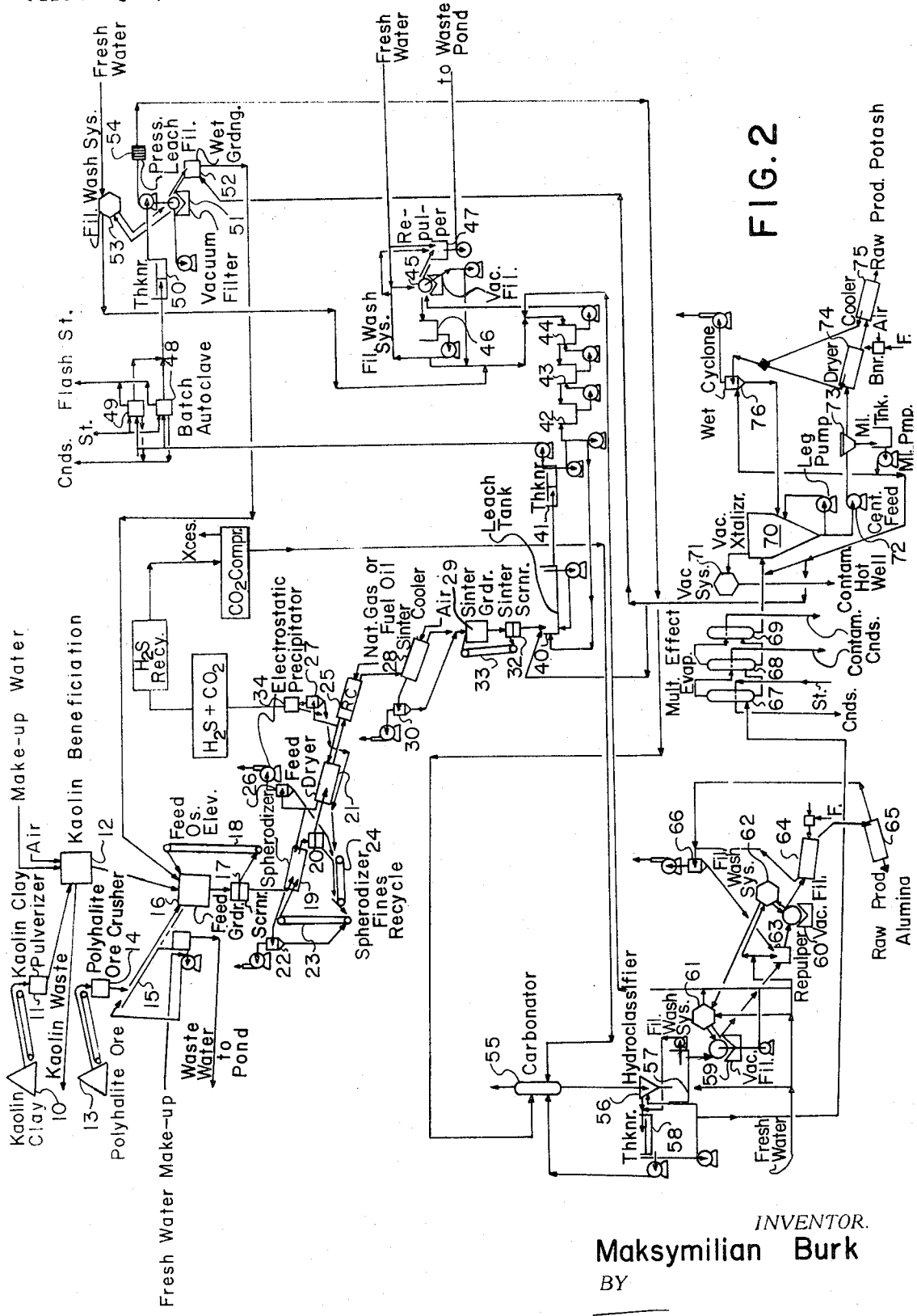
FIG. 2 is a schematic diagram of the equipment and processing steps used to produce the materials according to the invention.

Referring to FIGS. 1 and 2, kaolin clay 10 is beneficiated by first pulverizing in a clay pulverizer 11 and then separated from common impurities contained therein such as free silica, mica, limestone, iron compounds, fragments of undecomposed feldspathic rock or minerals, and organic substances. If the kaolin clay is sufficiently pure, the beneficiation step may be omitted. The beneficiation step may be economically performed by bringing the crude kaolin into an aqueous suspension in a tank 12 using air and makeup water. The aqueous suspension is formed by suitable blunging, washing, disintegrating, and dispersion operations. The clay is then classified by permitting the impurities to overflow as a thin film from the bowl. The purified clay is then combined with crushed polyhalite ore in a subsequent step.

(2) Washed polyhalite

Beneficiation of polyhalite ore 13 is required to reduce the sodium chloride concentration to 1% or less. This is carried out by first crushing the polyhalite ore in a crusher 14 and then washing the ore countercurrent on a table agitator 15 with either water or a diluted solution of potassium and magnesium sulfates in water. A suitable solution strength is 1 gram potassium sulfate and 8 grams magnesium sulfate per 100 grams of water. If water alone is used to remove the sodium chloride, about 10 pounds of potassium sulfate is lost per 100 pounds of removed sodium chloride; however, if the wash water contains potassium sulfate and magnesium sulfate, only about 5 pounds of potassium sulfate is lost per 100 pounds of removed sodium chloride.

Langbeinite, schoenite and $CaSO_4$ ore such as anhydrite, gypsum or limestone ($CaCO_3$) may be employed to augment the polyhalite.

(3) Preparation and mixing of raw materials (a) Grinding.—The washed polyhalite and beneficiated kaolin are fed as a slurry into a feed grinder 16 and then through a feed screener 17 to a spherodizing operation. Oversize particles from the feed screener 17 are recycled with an elevator 18 back to the grinder 16.

(b) Spherodizing.—The slurry of polyhalite and kaolin clay is then converted in a spherodizer 19 to about $\frac{1}{4}''$ diameter spheroid pellets having an approximate water content of 20%; this is accomplished by drying with natural gas or fuel oil from a burner, excess gas being removed from the inlet of the spheroidzer and removed from the system by a pump.

(c) Drying.—The pellets are then removed from the spherodizer and passed through a screen 20 and thence into a feed drier 21. Here most of the water content remaining in the spheres is removed by the natural gas. Entrained particles from the spherodizer 19 are separated by cyclone 22 and returned to the spherodizer inlet by elevator 23. Undersized spheres from screen 20 are recycled to the spherodizing inlet using a horizontal conveyor 24 and elevator 23. Particles entrained by the natural gas in the feed drier 21 are separated in a cyclone 26 and returned to the inlet of spheroidizer 19 by means of conveyor 24 and elevator 23.

(4) Reduction and calcining (sintering)

Following the drying operation, the spheres are first reduced in a rotary kiln 25 in a reducing atmosphere of "water gas" made from natural gas and steam. The reduction is carried out at about 900°–1000° C. for about ¼–1 hour. The reduction causes the raw materials to be decomposed and the sulfates reduced according to the following reactions:

Generation of water gas:

$$CH_4 + H_2O \rightarrow CO_2 + 3H_2$$
$$CH_4 + + H_2O \rightarrow CO_2 + 4H_2$$

Decomposition of raw materials:

$$(2\ SiO_2) \cdot Al_2O_3 \cdot 2H_2O \rightarrow 2SiO_2 + Al_2O_3 + 2H_2O$$

Kaolin clay $$CaCO_3 \rightarrow CaO + CO_2$$
$$2(CaSO_4) \cdot MgSO_4 \cdot K_2SO_4 \cdot 2H_2O$$
$$\rightarrow 2CaSO_4 + MgSO_4 + K_2SO_4$$

Polyhalite

Reduction of polyhalite sulfates:

$$CaSO_4 + 4H_2 \rightarrow CaS + 4H_2O \uparrow$$
$$CaS + H_2O \rightarrow CaO + H_2S \uparrow$$
$$K_2SO_4 + 4H_2 \rightarrow K_2S + 4H_2O \uparrow$$
$$K_2S + H_2O \rightarrow K_2O + H_2S \uparrow$$
$$MgSO_4 \rightarrow MgO + SO_2 \uparrow + 1/2 O_2 \uparrow$$
$$SO_2 + 3H_2 \rightarrow H_2S + 2H_2O$$

After the reduction has been substantially completed, the atmosphere in the kiln is changed from reducing to oxidizing by replacing the steam with air or oxygen for about 10–15 minutes at about the same temperature employed when reducing. During this time, the remaining sulfur compounds formed from the reduction of sulfates (free sulfur, sulphides, polysulphides, etc.) will burn off.

Following the reducing step the spheres are sintered in the rotary kiln 25 at a temperature of approximately 1125° C. using a retention time of 2 hours with a soak of 20 minutes. The silica in the clay will combine with the calcia or magnesia; the alumina will react with the potash to produce a sinter as follows:

$$2CaO + SiO_2 \rightarrow Ca_2SiO_4 \text{ (calcium orthosilicate)}$$
$$CaO + SiO_2 \rightarrow CaSiO_3 \text{ (calcium metasilicate)}$$
$$2MgO + SiO_2 \rightarrow Mg_2SiO_4 \text{ (magnesium orthosilicate)}$$
$$MgO + SiO_2 \rightarrow MgSiO_3 \text{ (magnesium metasilicate)}$$
$$2CaO + MgO + 2SiO_2 \rightarrow (2CaO) \cdot MgO \cdot 2SiO_2$$
(alkermanite)
$$Al_2O_3 + K_2O \rightarrow K_2O \cdot Al_2O_3 \text{ (potassium aluminate)}$$

Usually, calcining temperatures of about 1000°–1250° C. applied for ½ to 1 hour are sufficient.

Heat for the sintering operation is provided by natural gas or oil. The kiln is operated at a speed of about ½ to 1 r.p.m. and has a slope of about ½" per foot. As in the feed drier, particles which have been entrained by the natural gas are fed into a cyclone 27 and recycled back to the inlet of the spherodizer 19 along with the entrained particles from the feed drier 21. The natural gas which leaves the kiln at a lower temperature is employed in the feed drier.

The principal flue gases which are evolved include $CO_2$ and $H_2S$. The dust which is entrained by these gases (and which passes through the cyclone) is precipitated in electrostatic precipitator 34 and recycled to the inlet of the spherodizer 19.

The sinter is then forwarded to a cooler 28 where it is cooled by air and then passed to a grinder 29. Particles entrained by the air in the cooler 28 are separated in a cyclone 30 and recycled forward along with the sinter particles to the grinder 29.

For the sinter grinder, the material are passed through a screener 32 with oversize particles being recycled to the sinter grinder inlet using an elevator 33.

(5) Flue gas

The flue gas from the reduction stage may be processed to recover $H_2S$ such as by absorption with $H_3PO_4$. Preferably the $H_3PO_4$ should be a 40% solution; this achieves a high absorption rate for $H_2S$ and a low rate for $CO_2$. Unreacted methane, hydrogen and carbon monoxide may be reheated and utilized in the calcination reaction. The remaining $CO_2$ is cooled, washed, purified, compressed and then forwarded to a subsequent carbonation step.

(6) Leaching and washing

The ground sinter particles having the composition shown by the product of the sinter are passed from the screener 32 into a leach tank 40 for leaching with potassium carbonate solution; for this purpose there is employed one or more large tanks provided with agitators. Here the potassium aluminate is dissolved from the sinter, the latter becoming a mixture of insoluble dicalcium silicates and magnesium silicates.

The leaching operation is carried out at 60° C. for 30 minutes with a solution of potassium carbonate and potassium hydroxide using 2.3 tons of solution per ton of sinter. The leaching solution has a concentration preferably of 91 grams $K_2O$ and 25 grams of $CO_2$ per 1000 grams of water, and the caustic modulus of the leaching solution is 1.33. These values will, of course, vary depending on such factors as the composition of the raw materials, plant capacity, through-put rates, product quality, etc.

(7) Thickening and separation

The dissolved potassium aluminate and the insoluble silicates are passed as a slurry into a thickener 41 having a settling area of 1.7 square feet per ton of dry solids per day. The solution containing essentially potassium aluminate with minor amounts of silica and carbon dioxide is removed as the thickener overflow; this overflow is forwarded for desilication treatment. A minor amount is recycled to the leach tank 40 for use as part of the make-up for the leach solution.

The underflow from the thickener 41 is essentially insoluble silica, calcium oxide, magnesium oxide, and potassium carbonate solution. The insolubles are removed from the potassium carbonate solution by countercurrent washing using wash thickeners 42, 43, and 44 and are finally passed to a vacuum filter 45. Here the last of the potassium carbonate solution is removed with fresh water.

Fine tailings from the vacuum filter which are picked up by the fresh water are removed in a final thickening tank 46 and recycled back to the vacuum filter; the filter keg is forwarded to a repulper 47 where it is converted to a slurry using some of the fresh water and recycled solution from the vacuum filter; the slurry is then forwarded to a waste pond.

(8) Desilication

Returning to the overflow from the thickener 41, this usually contains dissolved silica from the leaching operation which should be removed by a desilication process prior to precipitating the alumina to aluminum hydroxide. Desilication is carried out using lime. About 10% of the thickener overflow is employed for slaking lime while the remainder is preheated to about 90–95° C. To the solution, which contains about 105 grams of alumina per liter of water, is added about 6 grams per liter of lime. The lime slaking operation is routine and hence is not shown. The streams of water containing the lime solution and the preheated solution are then joined and fed to autoclaves 48, 49 operating at about 100 p.s.i.g. at 175–180° C. The solutions are retained in the autoclaves for approximately 2 hours during which period over 90% of the silica in the solution will react with a small proportion of the alumina and the calcium and alkali oxides to form an insoluble precipitate. The pressure in the autoclave is then reduced to atmospheric in two stages in flash tanks which are built into the autoclaves; steam is recovered at a pressure of about 30 p.s.i.g. from the first stage. The desilication residue is settled from the solution in a thickener 50; underflow from the thickener is washed in a vacuum filter 51 and then forwarded for particle size reduction and repulping in a wet grinder 52 and subsequent recycling back to the feed grinder 16. Fines from the vacuum filter 51 are forwarded to a rotary filter wash system 53, where they are washed with fresh water and recycled back to the vacuum filter. Water used in the filter wash system is reused in vacuum filters 45 and 51.

Overflow from the thickener 50 is filtered in a pressure leaf filter 54, and the solution containing essentially alumina, potassium carbonate and a small amount of silica fines is forwarded to the carbonator 55.

(9) Carbonation

In the carbonator, the desilicated solution is carbonated at 90° C. for 12 hours with flue gases containing carbon dioxide, but from which the sulfur oxides and water have been removed as indicated previously. This causes aluminum hydroxide to be precipitated, according to the following equation:

$$K_2O \cdot Al_2O_3 + CO_2 + 3H_3C \rightarrow 2Al(OH)_3 \downarrow K_2CO_3$$

If desired, the precipitation is promoted by feeding the carbonated solution with about 25% of the fines of the precipitated aluminum hydroxide. The slurry from the carbonation contains a mixture of coarse and fine aluminum hydroxide particles. The coarse particles are separated from the fines, first in a hydroclassifier 56. and then, in a rake classifier 57. Overflow from the rake classifier is forwarded to a thickener tank 58. Part of the overflow from thickener tank 58 is recycled to the hydroclassifier 56, and part back to the carbonator. The balance of the thickener tank overflow, which is potassium carbonate solution, is pumped to evaporators for conversion to potash.

(10) Classification and thickening

Underflow from the rake classifier comprises aluminum hydroxide particles in a potassium carbonate solution. The aluminum hydroxide is separated from the solution in vacuum filters 59, 60 and filter wash systems 61, 62. Recycling of the filtrate wash water and aluminum hydroxide between the filters, wash systems, and a repulper 63 is shown by the arrows in FIG. 2.

(11) Calcination (to alumina)

The aluminum hydroxide precipitate obtained from filtration is dehydrated by feeding to a gas-fired rotary kiln 64 operating at about 900–1200° C. where it is retained for a period of about 1 to 4 hours, depending upon the desired properties of the alumina product. The temperature of the alumina is then reduced in cooler 65 and removed as product. Alumina fines from the calcination and cooling steps are recycled to a cyclone 66 and thence to the repulper 63.

(12) Evaporation and crystallization (to potash)

The solution from the thickener tank 58 in the carbonation step contains about 130 grams of $K_2O$ and 61 grams of $CO_2$ per 1000 grams of water. In order to recover the potash values (as $K_2CO_3 \cdot 3/2\ H_2O$), the solution from thickener tank 58 is concentrated by evaporation using multiple evaporators 67, 68, 69. The concentrate is then solidified in a vacuum crystallizer 70 which is evacuated by vacuum system 71. Wet crystals from the crystallizer are partially dried in a centrifuge feed pump 72 and then forwarded through a filter 73 to a dried 74 for complete drying using natural gas or fuel oil. The dry product is then cooled in cooler 75 and recovered as raw potash. Recycling of potash fines (using a cyclone 76) and potassium carbonate solution is employed at various stages of the potash recovery system as indicated by the arrows.

Alternately, the potassium carbonate may be converted into fertilizer grade KCl by heating with excess $CO_2$ and wash water NaCl as follows:

$$K_2CO_3 + CO_2 + H_2O + 2NaCl \rightarrow NaHCO_3 \downarrow + 2KCl$$

The insoluble sodium bicarbonate is separated by filtration and converted into sodium carbonate by heating at about 300° C. as follows:

$$2NaHCO_3 \xrightarrow{300° C.} Na_2CO_3 + CO_2 + H_2O$$

The filtrate is then concentrated to potassium chloride by evaporation and drying.

It will accordingly be seen that the process of the present invention not only recovers alumina as the primary product from kaolin, which is quite inexpensive, but also recovers $H_2S$, potash, KCl and soda to justify an economically viable operation. Furthermore, the carbon dioxide recovered from the flue gas is employed to precipitate the alumina thereby ensuring a more complete usage of the raw materials.

What is claimed is:

1. A process for recovering alumina values from alumino silicates which comprises:
   first reacting a mixture of an alumino silicate with a potassium sulfate and magnesium sulfate bearing ore in a reducing atmosphere for about ¼–1 hour at about 900° C.–1000° C.;
   then calcining for about ½–2 hours at about 1000° C.–1250° C. to produce a sinter containing potassium aluminate;
   leaching the potassium aluminate from the sinter;
   precipitating aluminum hydroxide in the potassium aluminate solution; and
   separating the aluminum hydroxide from the solution.

2. A process for recovering alumina values from alumino silicates which comprises:
   first reacting a mixture of a kaolin clay with a potassium sulfate and magnesium sulfate bearing ore in a reducing atmosphere for about ¼–1 hour at about 900° C.–1000° C.;

then calcining for about ½–2 hours at about 1000° C.–1250° C. to produce a sinter containing potassium aluminate;

leaching the potassium aluminate from the sinter;

precipitating aluminum hydroxide in the potassium aluminate solution; and separating the aluminum hydroxide from the solution.

3. A process for recovering alumina values from alumino silicates which comprises:

first reacting a mixture of a kaolin clay and a potassium sulfate bearing ore selected from the class consisting of langbeinite, polyhalite, and schoenite in a reducing atmosphere for about ¼–1 hour at about 900° C.–1000° C.;

then calcining for about ½–2 hours at about 1000° C.–1250° C. to produce a sinter containing potassium aluminate;

leaching the potassium aluminate from the sinter;

precipitating aluminum hydroxide in the potassium aluminate solution; and separating the aluminum hydroxide from the solution.

References Cited

UNITED STATES PATENTS

| | | | |
|---|---|---|---|
| 298,256 | 5/1884 | Townsend | 23—37 |
| 1,508,777 | 9/1924 | Cowles | 23—52 |
| 2,141,132 | 12/1938 | Folger | 23—52 X |
| 3,481,695 | 12/1969 | Hite | 23—52 |
| 1,895,580 | 1/1933 | Martin et al. | 23—52 |
| 472,668 | 4/1892 | Fleischer | 23—52 |
| 1,680,066 | 8/1928 | Rothe et al. | 23—142 X |
| 2,176,444 | 10/1939 | Zirngibl | 23—52 |
| 612,364 | 10/1898 | Raynaud | 23—52 |

FOREIGN PATENTS

| | | | |
|---|---|---|---|
| 12,947 | 4/1880 | Germany | 23—52 |

OSCAR R. VERTIZ, Primary Examiner

G. O. PETERS, Assistant Examiner

U.S. Cl. X.R.

23—52, 142